Oct. 1, 1957 C. C. HEILMAN ET AL 2,808,307

INSULATED FILING CABINET CONSTRUCTION

Filed Aug. 20, 1953 7 Sheets-Sheet 1

INVENTORS
Cecil C. Heilman and
Carl D. Graber
BY Frease & Bishop
ATTORNEYS

Oct. 1, 1957 C. C. HEILMAN ET AL 2,808,307

INSULATED FILING CABINET CONSTRUCTION

Filed Aug. 20, 1953 7 Sheets-Sheet 2

INVENTORS
Cecil C. Heilman and
Carl D. Graber
BY
Frease & Bishop
ATTORNEYS

Oct. 1, 1957 C. C. HEILMAN ET AL 2,808,307

INSULATED FILING CABINET CONSTRUCTION

Filed Aug. 20, 1953 7 Sheets-Sheet 3

INVENTORS
Cecil C. Heilman and
BY Carl D. Graber
Frease & Bishop
ATTORNEYS

Oct. 1, 1957 C. C. HEILMAN ET AL 2,808,307

INSULATED FILING CABINET CONSTRUCTION

Filed Aug. 20, 1953 7 Sheets-Sheet 4

INVENTORS
Cecil C. Heilman and
Carl D. Graber

BY Frease & Bishop

ATTORNEYS

INSULATED FILING CABINET CONSTRUCTION

Filed Aug. 20, 1953 7 Sheets-Sheet 5

INVENTORS
Cecil C. Heilman
Carl D. Graber
BY Frease & Bishop
ATTORNEYS

Oct. 1, 1957 C. C. HEILMAN ET AL 2,808,307

INSULATED FILING CABINET CONSTRUCTION

Filed Aug. 20, 1953 7 Sheets-Sheet 6

INVENTORS
Cecil C. Heilman and
BY Carl D. Graber
Frease & Bishop
ATTORNEYS

INSULATED FILING CABINET CONSTRUCTION

Filed Aug. 20, 1953 7 Sheets-Sheet 7

INVENTORS
Cecil C. Heilman and
Carl D. Graber
BY Frease & Bishop
ATTORNEYS

United States Patent Office 2,808,307

Patented Oct. 1, 1957

2,808,307

INSULATED FILING CABINET CONSTRUCTION

Cecil C. Heilman, Canton, and Carl D. Graber, Orrville, Ohio, assignors to Diebold Incorporated, Canton, Ohio, a corporation of Ohio Application August 20, 1953, Serial No. 375,339

29 Claims. (Cl. 312—214)

The invention or discovery relates in general to insulated filing cabinets of the type including a case having walls forming one or more compartments, each compartment having an end opening, usually at the front of the cabinet, and a drawer for each compartment of the case, each drawer being operatively mounted for movement into and out of its compartment and each drawer including a closure front, and the ends of the compartment forming walls around the end openings constituting jamb frames each including straight top, bottom, and side jamb frame members, each jamb frame member including at least one groove having a bottom wall and tongue side walls, and each drawer front being bounded by straight top, bottom, and side tongue walls arranged for fitting in the grooves of its associated jamb frame and grooves arranged for fitting over one set of the groove tongue walls of the jamb frame, and each of the compartment forming walls of the case and the drawer front having a composite construction including sheet metal shell walls containing a wall of heat insulating material.

The sheet metal shell walls of the case include sheet metal walls forming an outer shell for the entire cabinet, and inner liner shell walls for each compartment.

The present invention or discovery includes improvements in the insulated filing cabinet construction set forth in the prior U. S. Letters Patent No. 2,613,623, issued October 14, 1952, to Herbert C. Behrens. In the construction of said patent a separate sheet metal liner shell is provided for each compartment, and in the construction of other prior types of multiple compartment filing cabinets having full sheet metal shell liners for each compartment, an inner sheet metal shell liner has been subdivided by dividers including an inner pre-cast wall of insulation material and exposed surface walls of sheet metal, which combine with the inner sheet metal shell liner to form multiple compartments.

In either type of construction, the separate sheet metal shell liners, or the separate sheet metal encased dividers are required to be accurately located by fixtures in relation to one another and to the front frame including the jamb frame members for each drawer front. These fixtures are utilized during the assembly of the cabinets for facilitating the attachment of the liner shell walls and other case walls to each other.

From another standpoint, one of the major time and energy consuming operations in the welding of an assembly of the size and character of multiple compartment sheet metal shell liners attached to other sheet metal parts, is the turning or locating of the assembly into or in the plane required for proper positioning between the electrodes of a welding machine.

From still another standpoint, where full sheet metal shell liner walls are provided for each inner compartment of a multiple compartment cabinet, and some of the compartment walls are common to all of the compartments such as the side and back walls, it has been usual to form each common side wall from a separate sheet of metal, and also to form the common back wall from a separate sheet of metal. In such construction, it is relatively difficult to locate and assemble the common walls with each other and with the other parts of the inner compartment shell liners.

The objects of the present invention or discovery include the provision of an improved construction for the assembly including the sheet metal walls of the case of an insulated filing cabinet of the above described type, and in which the need of fixtures is eliminated for locating the sheet metal walls of the assembly during the connection of the sheet metal walls with each other, preferably by welding.

Further objects of the present invention or discovery include the provision of an improved construction for the assembly including the sheet metal walls of such a case, and in which the assembly of the sheet metal walls is required to be turned a minimum number of times during spot weld connection of the sheet metal walls to each other.

Further objects of the present invention or discovery include the provision of an improved construction and connection with each other of common sheet metal walls of such an assembly.

The foregoing and other objects are attained by the insulated filing cabinet construction, improvements, members, parts, combinations, and subcombinations, which comprise the present invention, the nature of which is set forth in the following general statement, and preferred embodiment of which together with their mode of use are set forth by way of example in the following description, and which are particularly and distinctly pointed out and set forth in the appended claims forming part hereof.

The nature of the improved construction constituting an assembly of sheet metal walls for the case of an insulated filing cabinet and the like, of the present invention or discovery may be stated in general terms as including a case assembly of sheet metal walls including an outer sub-assembly of connected sheet metal walls, and an inner sub-assembly of connected sheet metal walls connected with the outer sub-assembly.

The outer sub-assembly of connected sheet metal walls includes spaced top and bottom walls and spaced side walls and a jamb frame for a plurality of inner compartment openings.

The inner sub-assembly of connected sheet metal walls forms complete sheet metal liner walls for each of a plurality of front opening compartments, and includes a one piece sheet metal side and back wall common to all of the compartments, another sheet metal side wall common to all of the compartments, and a separate sheet metal top wall and a separate sheet metal bottom wall for each compartment. Some of the sheet metal walls of the inner sub-assembly are formed with portions supporting or spacing portions of other sheet metal walls of the inner sub-assembly independently of any other connections, and during the application of other connections such as spot welds.

By way of example, preferred embodiments of the insulated filing cabinet construction of the present improvements are illustrated in the accompanying drawings forming part hereof, in which:

Figure 1 is a view of a four drawer vertical insulated filing cabinet including the present improvements, the composite drawer compartment forming case being shown in vertical section, the top drawer being shown in side elevation partially withdrawn from its compartment, the second drawer from the top being shown in vertical section and in its closed position in its compartment, and the two lower drawers being shown partly in side elevation and partly in vertical section in the closed positions in their compartments;

Similar numerals refer to similar parts throughout the drawings.

Figure 1:
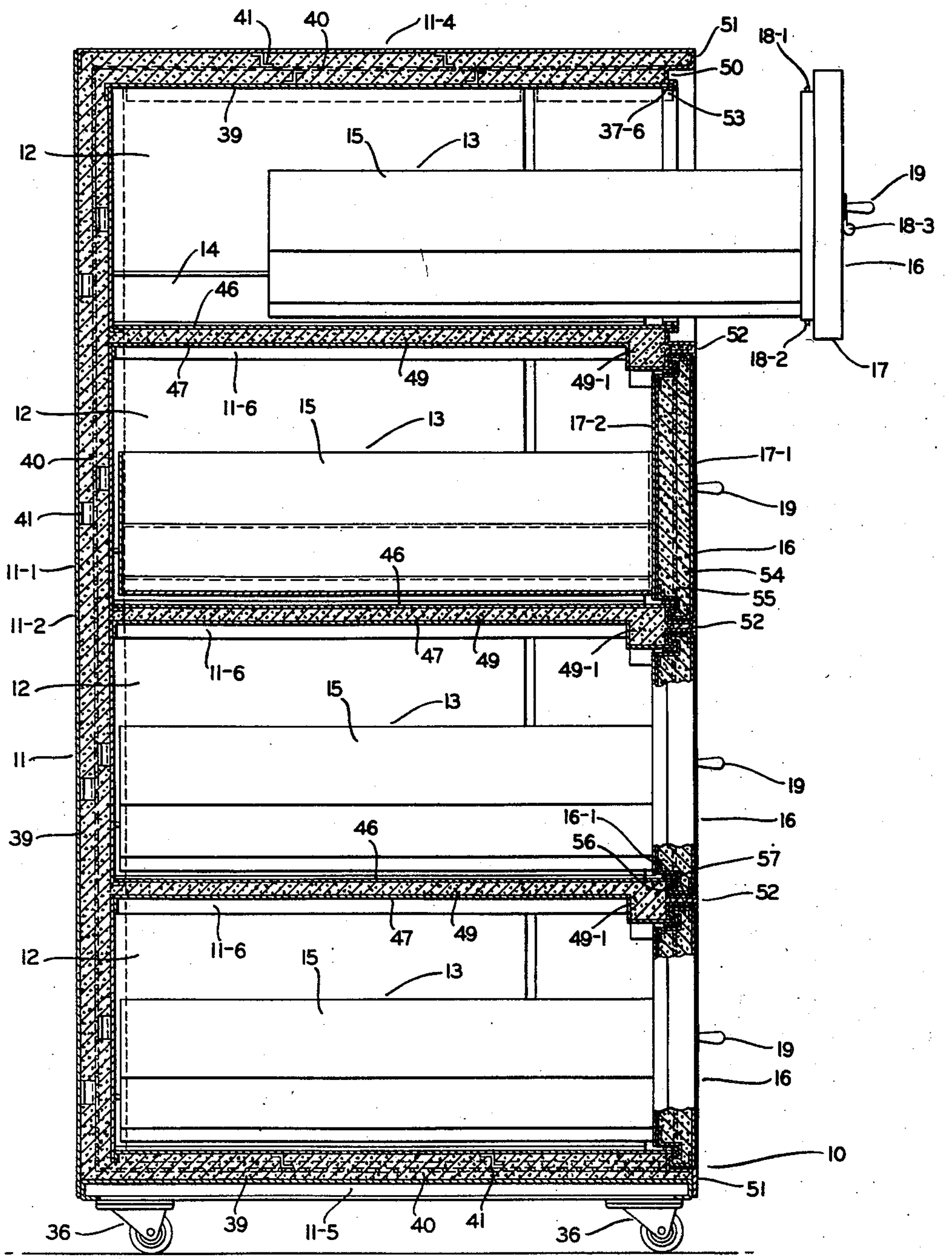

The illustrated embodiment of the insulated filing cabinet construction of the present improvements constitutes a four drawer filing cabinet indicated generally by 10 and includes a composite case indicated generally by 11 and having composite walls forming four end opening drawer compartments each indicated generally by 12 and located one above each other in the composite case 11. In each of the end opening drawer compartments 12 a file drawer indicated generally by 13 is mounted for horizontal movement, as by usual drawer suspension means including a guide channel 14 at each side of each compartment 12, the drawer suspension means being of usual construction and not otherwise described in detail.

Each drawer 13 includes an upwardly opening drawer body indicated generally by 15 on the forward end of which is secured a composite drawer front indicated generally by 16. Each drawer body 15 is formed of sheet metal walls and constitutes an upwardly opening longitudinally extending rectangular box, in which are stored in a usual manner letters, documents, and similar material, usually contained in file folders or binders, and there may be provided in the drawer body 15 a usual compressor not shown.

Each composite drawer front 16 includes an outer sheet metal shell indicated generally by 17 in which is operatively mounted an individual drawer lock of usual construction including as shown upper and lower latches 18–1 and 18–2 normally spring urged to extended position as shown in Fig. 1, and having an operative bolt work connection, not shown with an individual drawer lock release lever 18–3 operatively mounted for pivoting about a horizontal axis at the center of the composite drawer front 16, the operating lever 18–3 being on the outside of the front wall 17–1 of the shell 17. As shown a drawer pull indicated generally by 19 is secured to the front wall 17–1 of each drawer shell 17.

Each lower latch 18–2 of the individual drawer lock for each drawer 13 is arranged in a usual manner for engagement and disengagement with a rectangular keeper opening formed in the bottom wall of the compartment 12 in which the drawer is mounted, and similarly each upper latch 18–1 of each drawer 13 is arranged for engagement and disengagement in a usual manner with a rectangular keeper opening formed in the top wall of the compartment 12 in which the drawer is mounted.

Preferably, the filing cabinet 10 is provided with a collective drawer lock not shown.

The composite case 11 includes the rectangular composite rear wall indicated generally by 11–1, parallel and laterally spaced rectangular composite side walls, each indicated generally by 11–2, parallel and vertically spaced rectangular composite top and bottom walls indicated generally respectively by 11–4 and 11–5, and three vertically spaced composite partition walls each indicated generally by 11–6. As shown, the composite case 11 is supported on four casters each indicated generally by 36 secured to and depending from the case bottom wall 11–5. More frequently, the case 11 is not equipped with casters.

The several rectangular walls of the composite case 11 are joined with each other at corners and intersections, and form the four drawer compartments 12, all having the same opening dimensions, as shown, for mounting the drawers 13, all having the same dimensions as shown. The three lower compartments 12 have the same dimensions throughout. The top compartment is somewhat lower in its rear portion, than the similar portions of the other compartments.

Each of the composite walls of the composite case 11 includes outer sheet metal shell walls within which is contained a thicker wall of insulation material, some of the composite walls being provided with metal wire mesh reinforcement.

Each of the case composite side walls 11–2, and the case composite top wall 11–4 and composite bottom wall 11–5, and the composite back wall 11–1, includes an outer single ply rectangular sheet metal shell wall and an inner single ply rectangular sheet metal shell wall. The sheet metal shell walls are described in greater detail hereinafter, and are spaced from and parallel to each other, and a wall 39 of heat insulating material, such as asbestos cement is located between the sheet metal shell walls, the outer surfaces of the insulating wall 39 being in abutment with inner faces of the sheet metal shell walls. As shown and preferably, the insulating wall 39 embeds a metal wire mesh reinforcement 40 which is spaced from and supported by Z clips each indicated by 41 mounted on the inner faces of the sheet metal shell walls, and the clips on the outer sheet metal shell walls are spaced from the clips on the inner shell walls so that there is no direct metal path having any substantial cross sectional area between the outer sheet metal shell walls and the inner sheet metal shell walls.

Each of the composite partition walls 11–6 includes an upper sheet metal shell wall 46 and a lower sheet metal shell wall 47 which are vertically spaced from each other. The space between the upper sheet metal shell wall 46 and the lower sheet metal shell wall 47 in each composite partition wall 11–6 contains a wall 49 of insulation material having an enlarged front end 49–1.

The ends of the compartment forming walls around the end opening of each compartment constitute an improved jamb frame as set forth in said U. S. Letters Patent, No. 2,613,623, issued to Herbert C. Behrens, and including straight top, bottom, and side jamb frame members each including walls forming a rectangular groove 50, the straight sides of each groove 50 being formed by an outer tongue wall indicated generally by 51 or 52 and an inner tongue wall indicated generally by 53. For the top compartment 12 there is a jamb frame member having a groove 50 in the front end of the composite top wall 11–4, and in the front end of each composite side wall 11–2, and in the front end of the upper composite partition wall 11–6. A set of outer tongue walls include a tongue wall 51 in the top composite wall 11–4, and in each of the side walls 11–2, and a tongue wall 52 in the top composite partition wall 11–6. A set of inner tongue walls 53 include a tongue wall 53 in the top composite wall 11–4 in each of the side composite walls 11–2 and in the top partition wall 11–6.

The groove side tongue wall 52 in the front end of the top partition wall 11–6 is common to the bottom groove 50 of the top compartment 12 and to the top groove 50 for the compartment 12 which is the second from the top. Similarly, in the middle partition wall 11–6 there is a common groove side tongue wall 52 at its front end which is a side wall for the bottom groove 50 for the compartment 12 second from the top, and for the top groove 50 of the next lower compartment 12, that is the second from the bottom. The bottom partition wall 11–6 has a similar common groove side tongue wall for the bottom groove 50 of the compartment 12 second from the bottom and for the top groove 50 of the bottom compartment 12.

The case bottom wall 11–5 has a front end including a bottom jamb frame member having a groove 50 with an outer groove side tongue wall 51, and an inner groove side wall 53.

All of the compartments include jamb frame side members having grooves 50 formed in the front ends of the case side walls 11–2 and 11–3.

All of the jamb frame members formed in the front ends of the case top wall 11–4, the case side walls 11–2, and the case bottom wall 11–5 have the same composite construction, as set forth in detail in said U. S. Letters Patent No. 2,613,623, issued to Herbert C. Behrens.

In the front end of each of the partition walls 11–6 a composite double grooved jamb frame member is formed having a construction similar to the single grooved jamb frame member formed in the front ends of each of the case top side, and bottom walls. As previously described, in the front end of each of the partition walls 11–6 the jamb frame member includes parallel grooves 50 with a composite central common groove side tongue wall 52 and a multiply sheet metal tongue wall 53 for each groove.

In each composite drawer front 16 the outer sheet metal shell 17 is filled with a wall of insulating material 54, embedding metal wire mesh reinforcement 55, and each drawer front outer sheet metal shell 17 includes in addition to the front wall 17–1, a back wall 17–2, and at the top, bottom, and each side of the shell 17, sheet metal walls form a straight jamb member having a rectangular cross section and including an outer composite tongue 56 at the outside of an inner groove 57. The width of each drawer front composite tongue 56 is slightly less than the width of the jamb frame groove 50 in which it enters when the particular drawer is closed, and the width of each drawer front groove 57 is slightly greater than the jamb frame multi-ply sheet metal tongue wall 53 which fits in the groove 57 when the particular drawer is closed.

In each composite drawer front 16 a rear rectangular plug portion 16–1 extends rearwardly from the plane of the rear faces of the composite tongues 56 a distance which is substantially twice the depth of the tongues 56 from the front face of the drawer front, the plug portion 16–1 being slightly smaller than the rectangular opening bounded by the jamb frame terminal border portions 37–6 into which the plug portion 17–2 extends when the drawer is closed.

Figure 11:
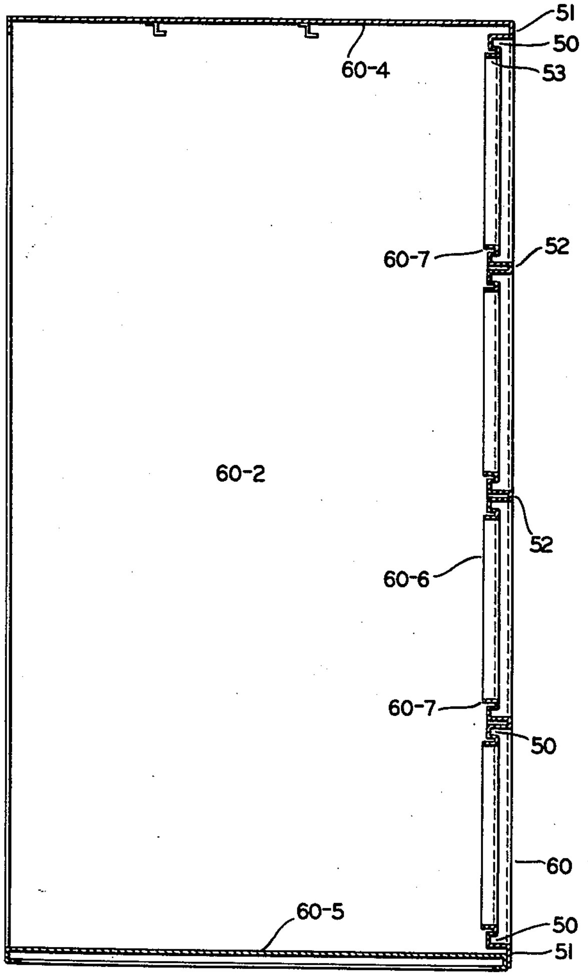
Fig. 11 is a vertical sectional view similar to Figs. 2 and 5, and showing the outer sub-assembly of the assembly of Fig. 2, before connection with the inner sub-assembly of Fig. 5 to produce the assembly of Fig. 2.

According to the present improvements, the outer sheet metal shell walls of the composite side walls 11–2 and the composite top 11–4 and the composite bottom wall 11–5, and the walls of the jamb frame members are included in an outer sub-assembly indicated generally by 60 and shown separately in Fig. 11.

Figures 5, 6, 7:
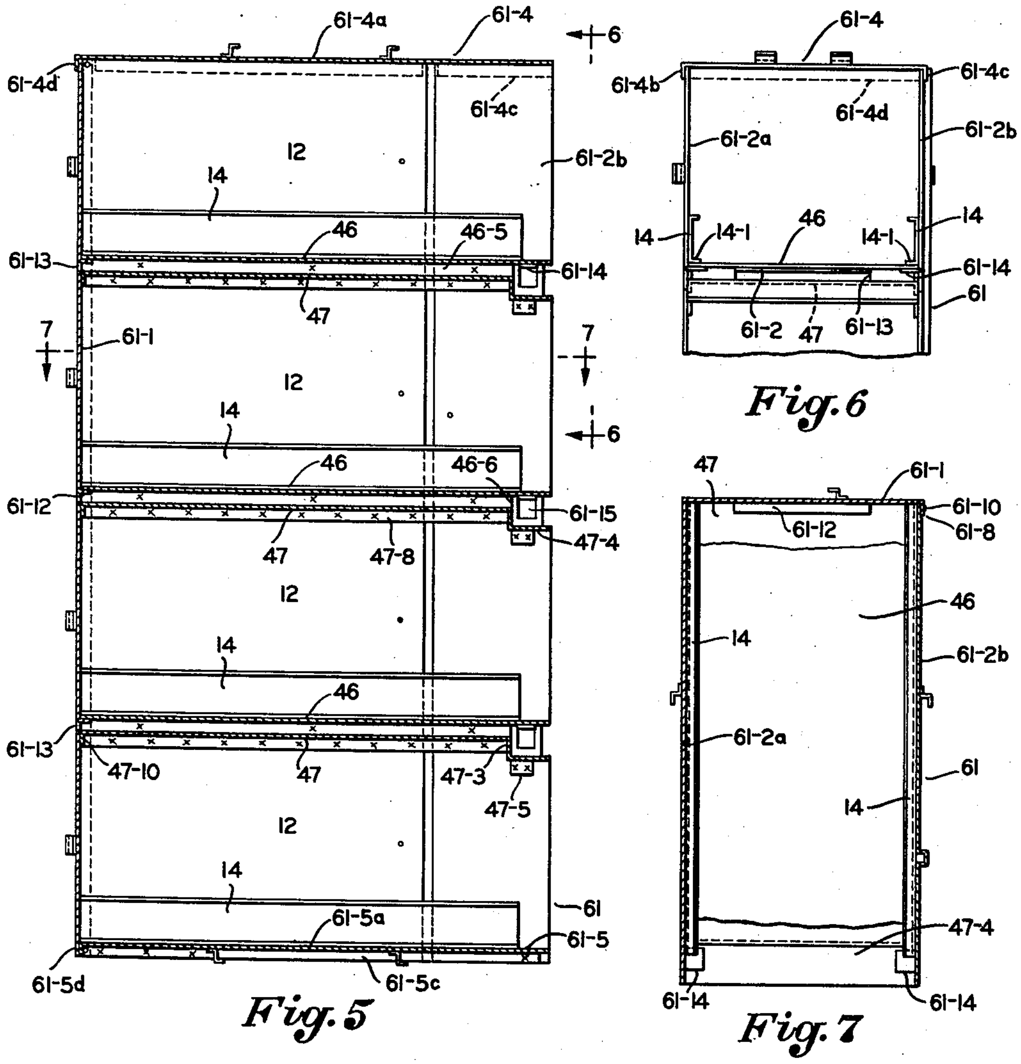
Fig. 5 is a vertical sectional view similar to Fig. 2 showing the inner sub-assembly of the assembly shown in Fig. 2, the inner sub-assembly constituting the inner sheet metal liner walls for the multiple compartments.
Fig. 6 is a fragmentary front elevational view thereof looking in the direction of the arrows 6—6, Fig. 5.
Fig. 7 is a horizontal sectional view thereof as on line 7—7, Fig. 6, portions being broken away.
Figure 8:
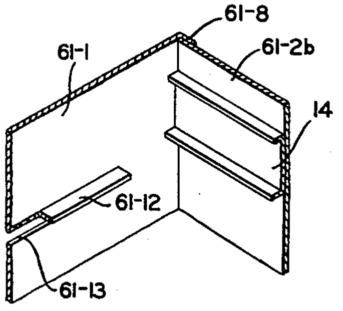
Fig. 8 is a fragmentary isometric view of an inner rear corner of portions of the sub-assembly of Fig. 5.

An inner sub-assembly indicated generally by 61 and shown separately in Figs. 5, 6, and 7, includes inner sheet metal shell walls of the composite side walls 11–2 and the composite top wall 11–4 and the composite bottom wall 11–5. The sub-assembly 61 also includes the inner sheet metal shell wall of the composite back wall 11–1, and the top and bottom walls of each of the composite partition walls 11–6.

Figure 2:
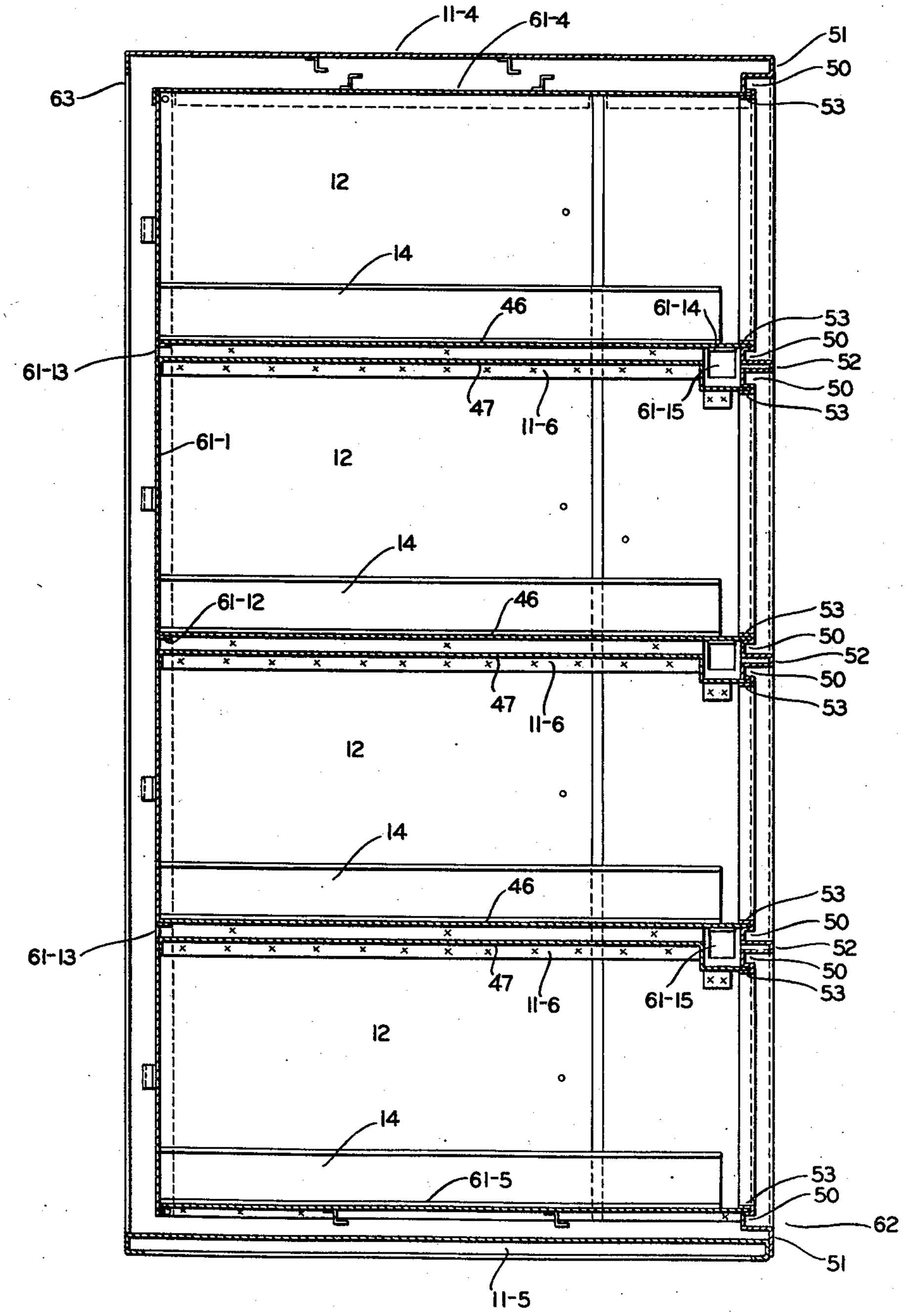
Fig. 2 is a vertical sectional view on line 2—2, Fig. 3, looking in the direction of the arrows, and showing the assembly of sheet metal shell walls of the multiple compartment forming case of the improved insulated filing cabinet of Fig. 1, before the heat insulating material has been introduced between the shell walls.
Figure 3:
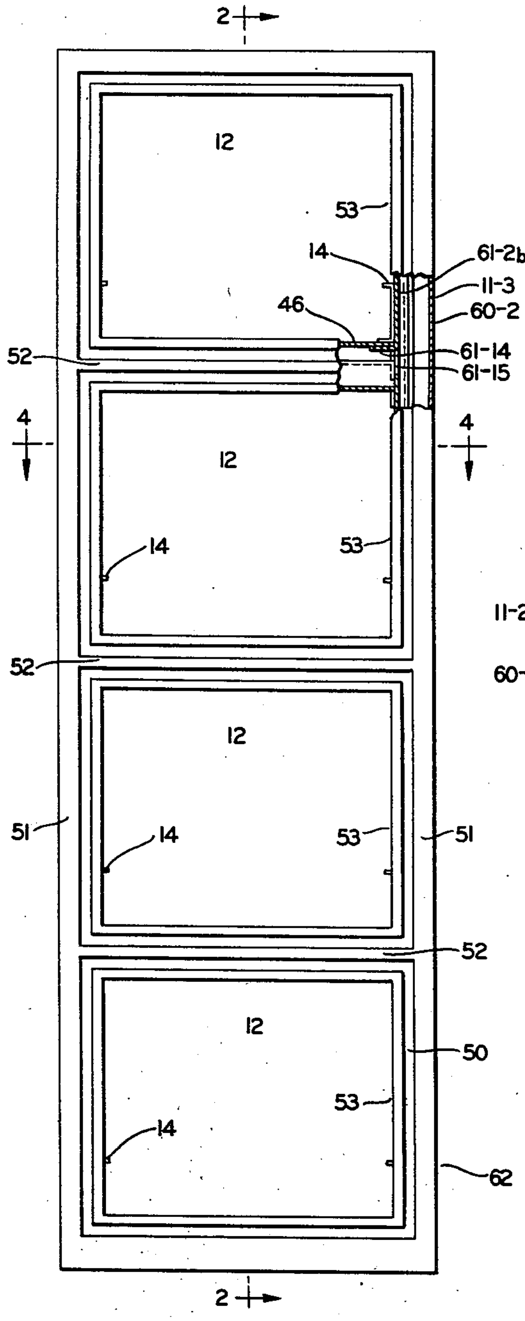
Fig. 3 is a front elevational view of the assembly of sheet metal shell walls shown in Fig. 2, portions being broken away and shown in section.
Figure 4:
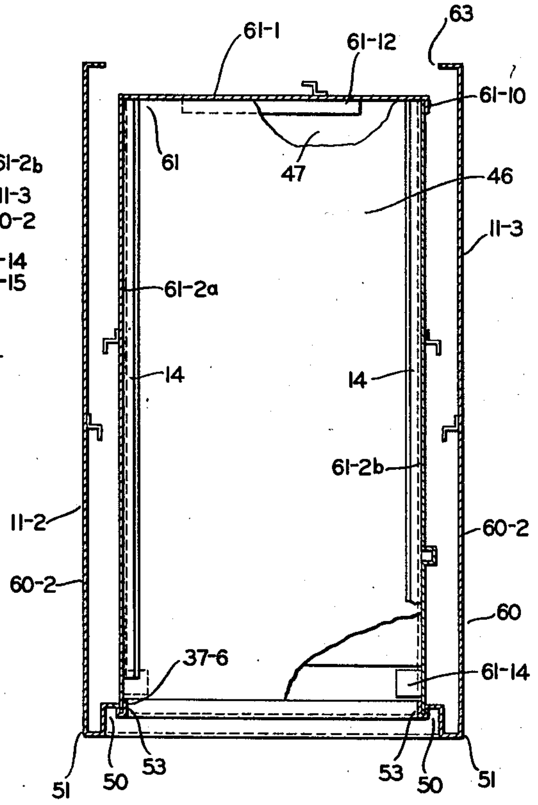
Fig. 4 is a horizontal sectional view thereof as on line 4—4, Fig. 3 looking in the direction of the arrows.

When the sub-assemblies 60 and 61 are connected together as shown in Figs. 2, 3, and 4, they constitute a sheet metal shell assembly indicated generally by 62 for the composite case 11, ready to receive the insulation material through a back opening 63 bounded by the rear ends of the outer sheet metal side, top, and bottom walls of the outer sub-assembly 60.

Referring to Figs. 11 and 4, the sheet metal shell walls of the outer sub-assembly 60 include parallel and laterally spaced rectangular side walls 60–2, and parallel and vertically spaced rectangular top and bottom walls indicated generally respectively by 60–4 and 60–5. The side edges of the top wall 60–4 connect with the upper edges of the side wall 60–2 at upper side corners.

Similarly, side border portions of the lower wall 60–5 connect with lower border portions of the side walls 60–2 at lower side corners of the sub-assembly 60.

The outer sheet metal sub-assembly 60 also includes at its front end, the formed and connected sheet metal members previously described, and constituting the plural opening jamb frame indicated generally by 60–6, and each jamb frame member for each drawer opening includes a rearwardly opening groove 60–7, which has a width sized to receive and fit the front border portion of one of the sheet metal walls of the inner sub-assembly 61.

Figure 14:
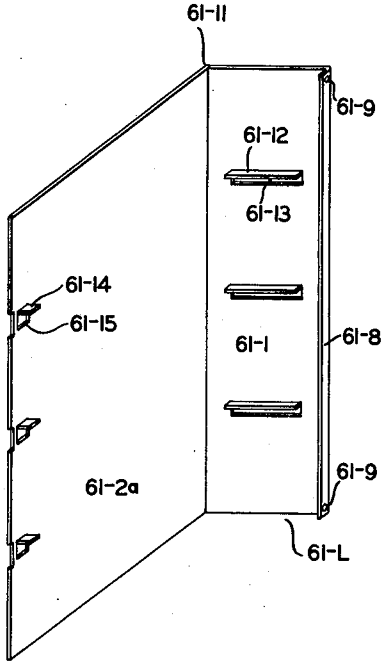
Fig. 14 is an oblique view illustrating the preferred one-piece formation of certain sheet metal walls of the inner sub-assembly.

The inner sub-assembly of sheet metal walls indicated generally by 61 is constructed of a plurality of one-piece sheet metal formations, one of which is shown separately at Fig. 14 and indicated generally by 61–L, and includes the sheet metal back wall 61–1 and one sheet metal side wall 61–2*a*. The one-piece sheet metal formation 61–L has a transverse cross section which is an L shape, and which is horizontal in the finished cabinet 10.

Another of the separate one-piece sheet metal formations of the inner sub-assembly 61 is the other side wall indicated generally by 61–2*b*.

The other one-piece sheet metal formations of the inner sub-assembly 61 include the top wall indicated generally by 61–4, and the bottom wall indicated generally by 61–5.

Figure 12:
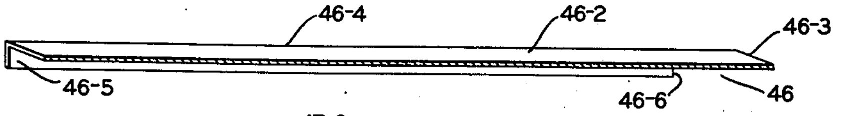
Fig. 12 is an oblique view with portions in sections showing a detached sheet metal liner bottom wall for one of the compartments.
Figure 13:
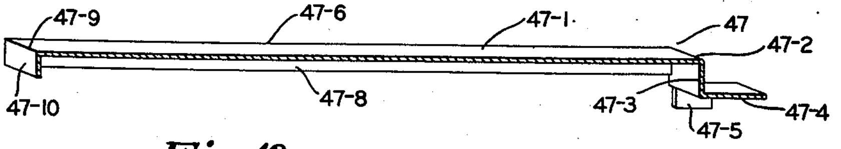
Fig. 13 is a view similar to Fig. 12 showing a detached sheet metal liner top wall for one of the compartments.

Finally, the inner sheet metal sub-assembly 61 includes for each compartment sheet metal shell liner formed in part by a portion of a partition 11–6, a sheet metal bottom wall indicated generally by 46 and shown separately in Fig. 12, and a sheet metal top wall indicated generally by 47 and shown separately in Fig. 13.

Figure 10:
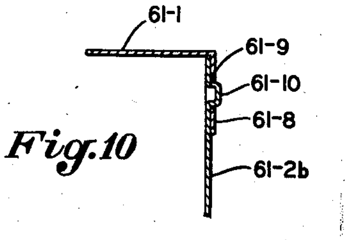
Fig. 10 is an enlarged fragmentary horizontal sectional view of a rear corner of portions of the sub-assembly of Fig. 5.

Referring to Fig. 14, the back wall 61–1 of the one-piece formation 61–L includes at its right vertical edge as viewed in Fig. 14, a forwardly extending vertical connector flange 61–8 having formed therein at each of its upper and lower ends a preferably circular aperture 61–9 each adapted for receiving a positioning button 61–10 formed on the rear end of the side wall **61–2*b*** for a purpose hereinafter described in detail, and as shown in Fig. 10.

The back wall 61–1 of the one-piece sheet metal formation 61–L has an integral connection at its other vertical edge with the rear vertical edge of the side wall **61–2*a* forming the left rear vertical corner 61–11** as viewed in Fig. 14.

At levels for supporting and positioning the rear ends of the compartment liner bottom wall formations 46, there is formed in the back wall 61–1 of the formation 61–L, a plurality of forwardly extending horizontal shelf tongues 61–12, each extending from the upper edge of a horizontal opening 61–13.

For supporting and positioning the front ends of one side of each compartment liner bottom wall 46, there is formed in the front end of the side wall **61–2*a* of the formation 61–L, a plurality of laterally inwardly extending shelf tongues 61–14, each extending from the top edge of a side opening 61–15**.

Figure 9:
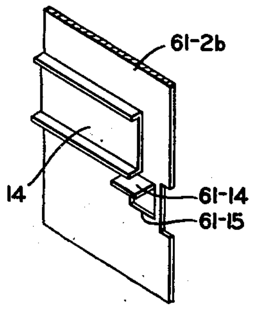
Fig. 9 is a fragmentary isometric view of front portions of the sub-assembly of Fig. 5.

Similarly, as best shown in Fig. 9, there is formed in the front end of the side wall **61–2*b*, for each bottom wall 46, a laterally inwardly extending shelf tongue 61–14 extending from a top edge of a side opening 61–15**.

As previously generally described, for each compartment 12 there is secured on each side wall **61–2*a* and 61–2*b* a drawer suspension means guide channel indicated generally by 14, and each including a lower horizontal inwardly extending flange 14–1, the bottom face of which is spaced above the level of the top faces of the shelf tongues 61–12 and 61–14 for each compartment, a distance sized by the thickness of the sheet metal used in the compartment liner bottom wall 46**.

As best shown in Fig. 12, each compartment liner bottom wall formation 46 includes a rectangular panel portion 46–1 having a front end edge 46–3. At each side edge or corner 46–4 of the panel portion 46–2, there extends downwardly a flange 46–5 which is perpendicular to the panel portion 46–2. One only of the flanges 46–5 is shown in Fig. 12, and a front end edge 46–6 of each flange 46–5 terminates to the rear of the front edge 46–3 of the panel portion 46–2.

As best shown in Fig. 13, each compartment liner top wall formation 47 includes a rectangular panel portion 47–1 from the front end edge or corner 47–2 of which there extends downwardly an intermediate flange 47–3 which is perpendicular to the panel portion 47–1. From the lower edge or corner of the intermediate flange 47–3 there extends forwardly a tongue flange 47–4 which is parallel with the panel portion 47-1. At each side edge or corner of the tongue flange 47–4 there extends downwardly a connector flange 47–5 which is perpendicular to the flange 47–4.

From each side edge or corner 47–6 of the panel portion 47–1, one of which is shown in Fig. 13, there extends downwardly a connector flange 47–8. From the rear edge or corner 47–9 of the panel portion 47–1 there extends downwardly a connector flange 47–10. The connector flanges 47–8 and 47–10 are perpendicular to the panel portion 47–1.

The top wall 61–4 of the inner sub-assembly 61 includes a rectangular panel portion **61–4*a* from the opposite side edges or corners of which there extends downwardly side connector flanges 61–4*b* and 61–4*c* and from the rear edge or corner which there extends downwardly a rear connector flange 61–4*d***.

Similarly, the bottom wall formation 61–5 of the inner sub-assembly 61 includes a rectangular panel portion **61–5*a*, from the side corner edges of which extend downwardly side connector flanges 61–5*b* and 61–5*c*, and from the rear edge or corner of which extends downwardly a rear connector flange 61–5*d***.

The details of construction of the one-piece formations of the sheet metal inner sub-assembly 61 as above described, are arranged so as to permit spot welded connection of the parts of the inner sub-assembly 61, without the use of jigs or fixtures, and in the following manner.

The spot welded connections of the sheet metal parts of the inner sub-assembly 61 is accomplished by the use of welding equipment which is preferably a standard spot welding machine with electrodes vertically movable with respect to each other for contacting the abutting plies or parts of sheet metal to be welded at each spot. A usual table with an overall horizontal top is provided having the height of the plane of the horizontal top a proper distance from the floor on which the table rests to position parts resting upon the horizontal table top between the electrodes.

In Figs. 15 to 19 inclusive of the drawings, which illustrates successive steps in the spot weld connection of the parts of the inner sub-assembly 61, the table is not shown since the table may have specific details of construction which are variable, but any of which are such as to position parts lying on the table top at the proper height so that the abutting parts to be spot welded may be successively positioned between the electrodes of the welding machine as the successive spot welds are made by operation of the spot welding machine in the usual manner.

As previously indicated, one of the major time and energy consuming series of similar operations in the spot welding of sub-assemblies of the size and arrangement of the inner sub-assembly 61, when carried out by usual methods, has been a series of numerous turnings of the sub-assembly as the spot welding is carried on so as to bring parts successively into the plane required for proper positioning between the electrodes of the spot welding machine.

The improvements of the present invention or discovery arising from the details of construction of the parts of the inner sub-assembly 61, as above set forth in detail, include an improved method of successively making the required spot welds by steps requiring a series of only three turns or locations of the sub-assembly to successively place the sub-assembly in three positions as the spot welding progresses.

These three positions of the sub-assembly 61 are defined herein as being Position I, Position II, and Position III. The parts of the inner sub-assembly 61 are shown as they become connected with each other in various stages of the welding operations performed in Position I in Figs. 15, 16, and 17.

Figure 18:
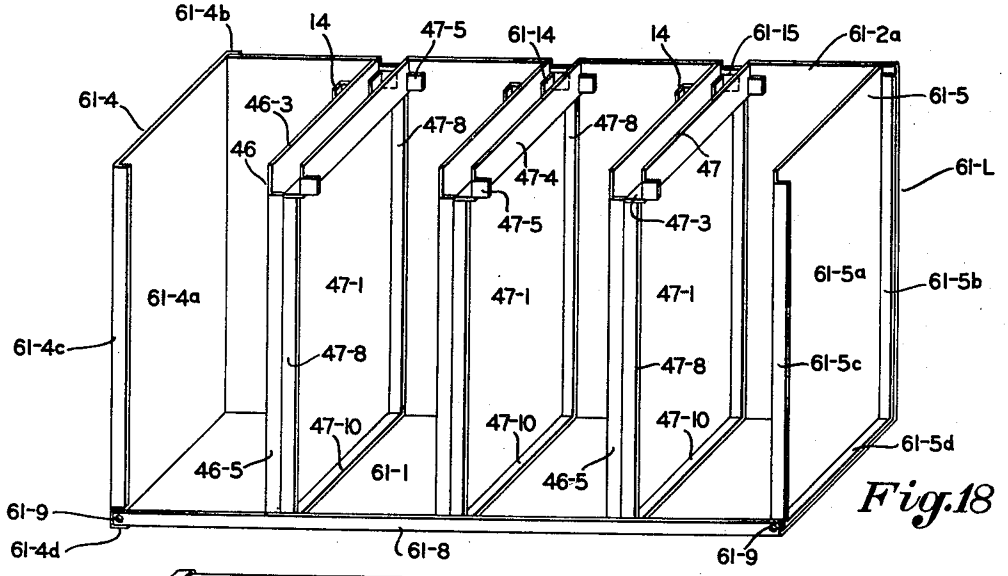
Fig. 18 is a similar view showing parts of the inner sub-assembly at Position II as supported on the welding table, not shown, for further welding operations.

In Fig. 18, parts of the inner sub-assembly 61 are shown after having been partially connected with each other by the spot welding operations performed in Position I, and after having been turned to Position II for further spot welding operations.

Figure 19:
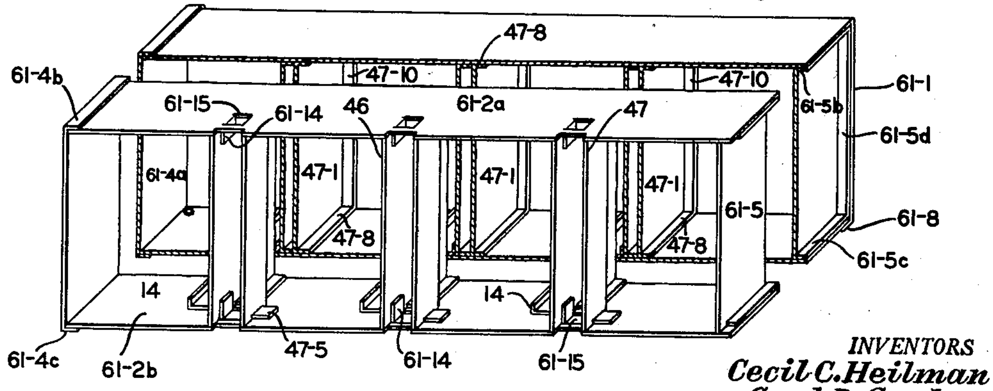
Fig. 19 is a similar view showing parts of the inner sub-assembly as supported on the welding table, not shown, in Position III for the final welding operations on the inner sub-assembly.

In Fig. 19, all the parts of the inner sub-assembly 61 are shown in Position III, for the performance of the final welding operations on the inner sub-assembly.

Describing the operations performed at Position I, the first part located in Position I is the one-piece sheet metal formation 61–L which is placed on the welding table top so that the side wall **61–2*a* is supported in a horizontal position and the back wall 61–1 extends upwardly. It is noted that one of the advantages obtained from the one-piece construction of the sheet metal formation 61–L arises from the accurate positioning of each set of shelf tongues 61–12 and 61–14 with respect to each other and with respects to the overlying flanges or legs 14–1 of the guide channels for each set of shelf tongues 61–12 and 61–14**.

Similar advantages arise from the accurate positioning with respect to each other of the upper and lower edges of the side wall **61–2*a* and the back wall 61–1 in the one-piece sheet metal formation 61–L**.

Figure 15:
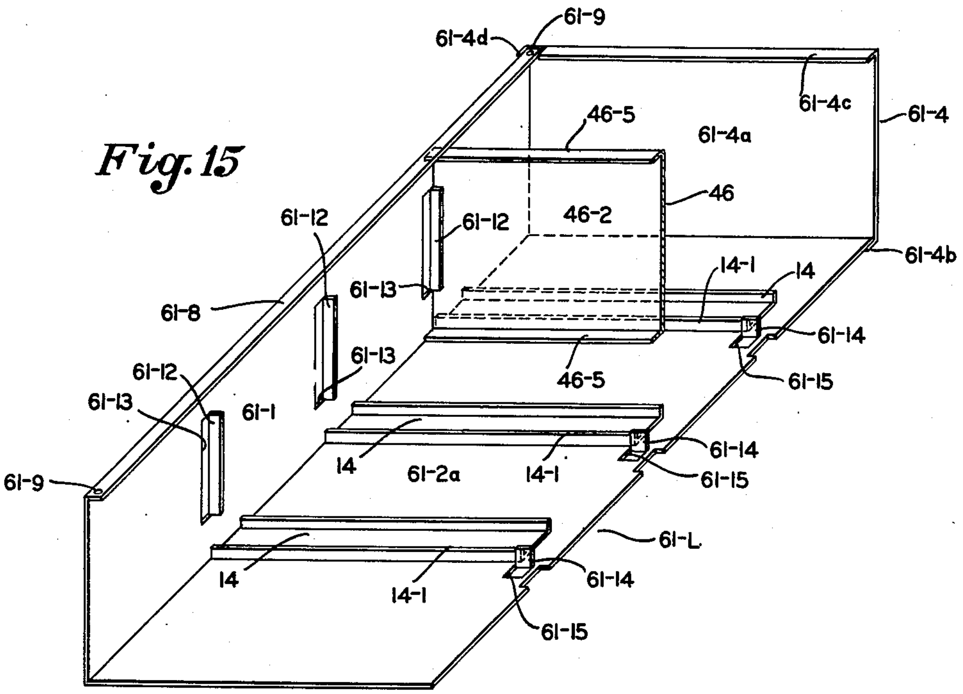
Fig. 15 is an oblique view showing parts of the inner sub-assembly in Position I as supported on a welding table, not shown, and at an early stage in the welding operations at Position I.

After the formation 61–L has been placed in Position I, the top wall formation 61–4 is positioned as shown in Fig. 15 with the flange **61–4*c* overlapping the upper end of the side wall 61–2*a* and the flange 61–4*d* overlapping the upper end of the back wall 61–1. The upper edges of the side wall 61–2*a* and the back wall 61–1 abut against the inner face of the panel portion 61–4*a*, and thus the formations 61–L and 61–4*a* are accurately located with respect to each other, without the use of a fixture, and so as to permit the spot welding of the flange 61–4*c* to the upper end of the side wall 61–2*a*,** by the usual operation of the spot welding machine.

After the series of spot welds have been made connecting the flange **61–4*c* to the upper end of the side wall 61–2*a*, one of the compartment liner bottom wall formations 46 is inserted in the formation 61–L as shown in Fig. 15 so that the lower face of its panel portion 46–2 is supported at its rear end on the upper face of the shelf tongue 61–12 nearest the top wall 61–4*a*. The upper face of the panel portion 46–2 abuts against the lower face of the flange or leg 14–1 of the uppermost guide channel 14 on the side wall 61–2*a*. The forward unflanged end portion of the panel portion 46–2, at one side, seats upon the uppermost shelf tongue 61–14 on the side wall 61–2*a*.**

Thus, the uppermost formation 46 is positioned in the formation 61–L, without the use of a fixture, so that the flange 46–5 of the formation 46 abuts the side wall **61–2*a* of the formation 61–L in position permitting the making of the successive spot welds connecting the flange 46–5 to the side wall 61–2*a*.**

Figure 16:
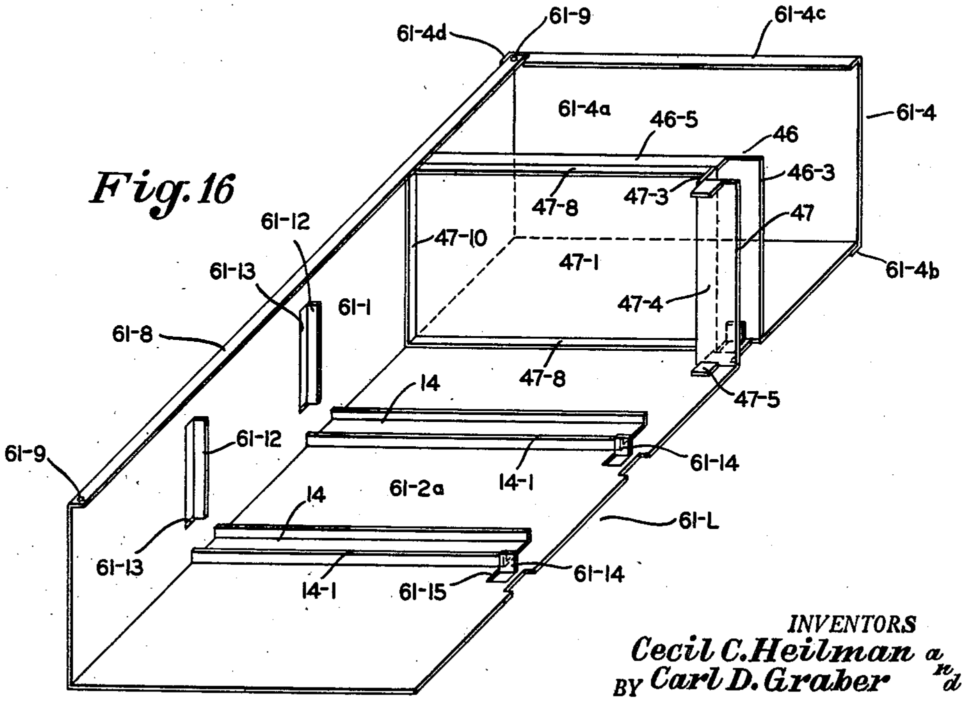
Fig. 16 is a similar view of the inner sub-assembly, showing parts thereof at an intermediate stage of the welding operations at Position I.

Next, the uppermost compartment liner or top wall formation 47 is inserted in the formation 61–L in Position I, as shown in Fig. 16. The panel portion 47–1 has its upper side edges abutting the lower ends of the flanges 46–5 of the uppermost formation 46. The outer face of the rear connector flange 47–10 abuts against the inner face of the back wall 61–1. One of the side flanges 47–8 abuts against the side wall **61–2*a* and one of the connector flanges 47–5 abuts against the side wall 61–2*a*.**

The uppermost formation 47 is thus located in the formation 61–L in Position I, without the use of a fixture. The spot welding machine may then be operated to connect the flanges 47–8 and 47–5 and the abutting side wall **61–2*a*** with each other.

In a similar manner, the formations 46 and 47 for the intermediate or center partition are spot weld connected with the formation 61–L in Position I, and then the formations 46 and 47 for the lowermost partition are spot weld connected to the formation 61–L in Position I.

Figure 17:
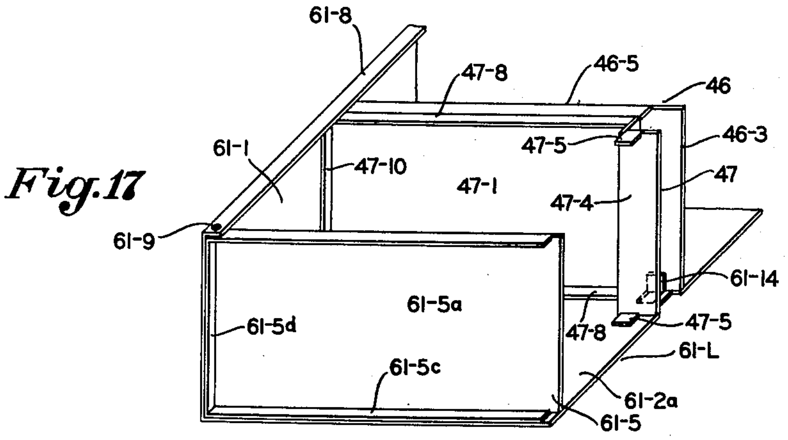
Fig. 17 is a similar view showing parts of the inner sub-assembly at the final stage of the welding operations at Position I.

Finally, as shown in Fig. 17, the bottom wall formation 61–5 is located in the formation 61–L as shown in Fig. 17, with its side connector flange **61–5*c* abutting the side wall 61–2*a*, and with its rear connector flange 61–5*d* abutting the back wall 61–1. The bottom wall formation 61–5 thus is inserted in the formation 61–L as shown in Fig. 17, without the use of a fixture, and the flange 61–5*c* and abutting side wall 61–2*a*,** may be spot weld connected with each other, in the usual manner.

After completing the welding operations in Position I, the one-piece formation 61–L, and the parts connected thereto are turned to Position II, in which the back wall 61–1 is horizontal, as shown in Fig. 18.

In Position II, the rear connector flange **61–4*d* of the top wall 61–4 is spot welded to the back wall 61–1, after which each of the three connector flanges 47–10 of the compartment liner top wall formations 47 are spot welded to the back wall 12, and the rear connector flange 61–5*d* of the bottom wall formation 61–5 is spot welded to the back wall 61–1**.

After the welding operations are completed in Position II, the side wall **61–2*b* is put into position within the sub-assembly 61, with the positioning buttons 61–10 engaged in the apertures 61–9 of the vertical connector flange 61–8 on the back wall 61–1 of the one-piece formation 61–L**.

The flange 61–8 on the back wall 61–1 overlaps the outer face of the rear and border portion of the side wall **61–2*b*. The flange 61–4*c* of the top wall 61–4 overlaps the upper end border of the side wall 61–2*b*. The flanges 47–8, and the tongues 47–5, which are at the front in Fig. 18, are then in abutment with the inner face of the side wall 61–2*b*. The flanges 46–5 of the compartment liner bottom wall formations 46 are likewise in abutment with the inner face of the side wall 61–2*b*. The adjacent side border portions of the panel portions 46–1 are located beneath the flanges 14–1, and the forward shelf tongues 61–14 are located beneath the front end of the panel portions 46–1**.

All the parts of the inner sub-assembly 61 are thus brought together, and final connections are made by turning the sub-assembly 61 to Position III, as shown in Fig. 19.

In Position III, the top wall flange **61–4*c* is spot welded to the upper end border of the side wall 61–2*b*. The flanges 47–5 and 47–8 in abutment with the inner face of the side wall 61–2*b* are spot welded thereto. Finally, the side connector flange 61–5*c* of the bottom wall 61–5 is spot welded to the lower border of the side wall 61–2*b*.**

The inner sub-assembly 61 is thus completed, and is connected with the outer sub-assembly 60, as previously described.

After the connection of the inner sub-assembly 61 with the outer sub-assembly 60, the space between the shell walls of the two sub-assemblies are filled with heat resisting material, as previously described, through the back opening 63, after which the outer shell back wall 11–2 of the composite back wall 11–1 is applied, as shown in Fig. 1.

It is to be noted that utilizing the one-piece formation 61–L including the angled walls **61–2*a* and 61–1 as a keel-like formation in which all other parts of the sub-assembly 61** are located, interengaged, and connected, during the operations, above described, at the Positions I, II and III, constitutes a construction and method of assembly, which may be used for structures specifically different than the insulated filing cabinet construction illustrated and described herein in detail.

For example, other types of multiple compartment construction which may utilize the present improvements instructure and method to advantage, may include the following: cold or frozen storage cabinets, internment vaults, and double wall construction for the hulls and bulk heads of barges or other boats or ships.

In some instances the separate one-piece formations of the improved construction hereof may be desired to be connected by rivets or bolts instead of by spot welds, as described in detail herein. In such cases the interengaging arrangement of parts eliminates the need for fixtures, regardless of the particular type of connection used.

While the improved multiple compartment construction is particularly advantageous when the one-piece formations thereof are made of sheet metal, preferably steel, as set forth in detail herein, it is noted that when the one-piece formations are made of other material such as plastic materials, regardless of the type of connection used, many of the advantages of the improvements are realized.

The embodiments of the present invention illustrated and described herein are by way of example, and the scope of the present invention is not limited to the same or to the particular details thereof, but is commensurate with any and all novel subject matter contained herein which may at any time properly under the patent laws be set forth in th claims hereof or originating herein, and the elements of any of such claims are intended to include their functional or structural equivalents.

We claim:

1. In a structure including a plurality of compartments and each compartment having a front end opening in the same plane of the structure and a back wall opposite the front end opening; the combination including an outer sub-assembly formed entirely of sheet metal walls and members and an inner sub-assembly formed entirely of sheet metal walls and members; the sheet metal walls and members of the outer sub-assembly including frame members extending around each compartment end opening; and the sheet metal walls and members of the inner sub-assembly forming the plurality of compartments and including spaced opposite side walls and a back wall extending between the rear ends of the side walls, a top wall spanning upper end portions of the side walls and back wall, a bottom wall spanning lower end portions of the side walls and back wall, and a partition wall located between the top wall and the bottom wall and bordering the side walls and back wall; some of the sheet metal walls and members of the inner sub-assembly having front end portions connecting with some of the compartment end opening frame members of the outer sub-assembly; and one of the side walls and the back wall of the inner sub-assembly being common to all of the compartments, the common side wall and the common back wall of the inner sub-assembly constituting a one-piece keel-like formation having a transverse cross section which is an L shape.

2. In a structure including a plurality of compartments and each compartment having a front end opening in the same plane of the structure and a back wall opposite the front end opening; the combination including an outer sub-assembly formed entirely of sheet metal walls and members and an inner sub-assembly formed entirely of sheet metal walls and members; the sheet metal walls and members of the outer sub-assembly including frame members extending around each compartment end opening; and the sheet metal walls and members of the inner sub-assembly forming the plurality of compartments and including spaced opposite side walls and a back wall extending between the rear ends of the side walls, a top wall spanning upper end portions of the side walls and back wall, and a bottom wall spanning lower end portions of the side walls and back wall; some of the sheet metal walls and members of the inner sub-assembly having front end portions connectnig with some of the compartment end opening frame members of the outer sub-assembly; and one of the side walls and the back wall of the inner sub-assembly being common to all of the compartments, and the common side wall and the common back wall constituting a one-piece keel-like formation having a transverse cross section which is an L shape; and a compartment bottom wall spaced from the top wall and bordering the side walls and back wall of the inner sub-assembly, and a compartment top wall adjacent the compartment bottom wall and bordering the side walls and back wall of the inner sub-assembly, and there being a space between the compartment bottom wall and the compartment top wall.

3. In a structure including a plurality of compartments and each compartment having a front end opening in the same plane of the structure and a back wall opposite the front end opening; the combination as set forth in claim 2, and in which each common wall of the inner sub-assembly has formed therein an opening communicating with the space between the compartment bottom wall and the compartment top wall.

4. In a structure including a plurality of compartments and each compartment having a front end opening in the same plane of the structure and a back wall opposite the front end opening; the combination as set forth in claim 2, and in which a shelf tongue extends from each common wall of the inner sub-assembly and supports the compartment bottom wall.

5. In a structure including a plurality of compartments and each compartment having a front end opening in the same plane of the structure and a back wall opposite the front end opening; the combination including an outer sub-assembly formed entirely of sheet metal walls and members and an inner sub-assembly formed entirely of sheet metal walls and members; the sheet metal walls and members of the outer sub-assembly including frame members extending around each compartment end opening; and the sheet metal walls and members of the inner sub-assembly forming the plurality of compartments and including spaced opposite side walls and a back wall extending between the rear ends of the side walls, the side walls and back wall being common to all of the compartments, a top wall spanning upper end portions of the side walls and back wall, a bottom wall spanning lower end portions of the side walls and back wall; and some of the sheet metal walls and members of the inner sub-assembly having front end portions connecting with some of the compartment end opening frame members of the outer sub-assembly; and a compartment bottom wall spaced from the top wall and bordering the side walls and back wall of the inner sub-assembly, and a compartment top wall adjacent the compartment bottom wall and bordering the side walls and back wall of the inner sub-assembly, and there being a space between the compartment bottom wall and the compartment top wall; one of the common side walls and the common back wall of the inner sub-assembly constituting a one-piece keel-like formation having a transverse cross section which is an L shape.

6. In a structure including a plurality of compartments and each compartment having a front end opening in the same plane of the structure and a back wall opposite the front end opening; the combination as set forth in claim 5, and in which each common wall of the inner sub-assembly has formed therein an opening communicating with the space between the compartment bottom wall and the compartment top wall.

7. In a structure including a plurality of compartments and each compartment having a front end opening in the same plane of the structure and a back wall opposite the front end opening; the combination as set forth in claim 5, and in which a shelf tongue extends from each common wall of the inner sub-assembly and supports the compartment bottom wall.

8. In a structure including a plurality of compartments and each compartment having a front end opening in the same plane of the structure and a back wall opposite the front end opening; the combination including an outer sub-assembly formed entirely of sheet material walls and members and an inner sub-assembly formed entirely of sheet material walls and members; the sheet material walls and members of the outer sub-assembly including frame members extending around each compartment end opening; and the sheet material walls and members of the inner sub-assembly forming the plurality of compartments and including spaced opposite side walls and a back wall extending between the rear ends of the side walls, a top wall spanning upper end portions of the side walls and back wall, a bottom wall spanning lower end portions of the side walls and back wall, and a partition wall located between the top wall and the bottom wall and bordering the side walls and back wall; some of the sheet material walls and members of the inner sub-assembly having front end portions connecting with some of the compartment end opening frame members of the outer sub-assembly; and one of the side walls and the back wall of the inner sub-assembly being common to all of the compartments, and the common side wall and the common back wall of the inner sub-assembly constituting a one-piece keel-like formation having a transverse cross section which is an L shape.

9. A structure of the type including a plurality of compartments and each compartment having a front end opening in the same plane of the structure and a back wall opposite the front end opening, the structure being formed entirely of sheet metal walls and including spaced opposite side walls and a back wall extending between the rear ends of the side walls, a top wall spanning upper end portions of the side walls and back wall, and a bottom wall spanning lower end portions of the side walls and back wall, and a partition wall located between the top wall and the bottom wall and bordering the side walls and the back wall; and one of the side walls and the back wall of the structure being common to all of the compartments, the common side wall and the common back wall of the structure constituting a one-piece keel-like formation having a transverse cross section which is an L shape.

10. A structure of the type including a plurality of compartments and each compartment having a front end opening in the same plane of the structure and a back wall opposite the front end opening, the structure being formed entirely of sheet metal walls and including spaced opposite side walls and a back wall extending between the rear ends of the side walls, a top wall spanning upper end portions of the side walls and back wall, and a bottom wall spanning lower end portions of the side walls and back wall; and one of the walls of the structure being common to all of the compartments; and a compartment bottom wall spaced from the top wall and bordering the side walls and bottom wall of the structure, and a compartment top wall adjacent the compartment bottom wall and bordering the side walls and bottom wall of the structure, and there being a space between the compartment bottom wall and the compartment top wall, the common wall of the structure having formed therein an opening communicating with the space between the compartment bottom wall and the compartment top wall.

11. A structure as set forth in claim 10, and in which a shelf tongue extends from the common wall of the structure and supports the compartment bottom wall.

12. A structure of the type including a plurality of compartments and each compartment having a front end opening in the same plane of the structure and a back wall opposite the front end opening, the structure being formed entirely of sheet metal walls and including spaced opposite side walls and a back wall extending between the rear ends of the side walls, a top wall spanning upper end portions of the side walls and back wall, and a bottom wall spanning lower end portions of the side walls and back wall; and one of the side walls and the back wall of the structure being common to all of the compartments, and the common side wall and the common back wall constituting a one-piece keel-like formation having a transverse cross section which is an L shape; and a compartment bottom wall spaced from the top wall and bordering the side walls and back wall of the structure, and a compartment top wall adjacent the compartment bottom wall and bordering the side walls and back wall of the structure, and there being a space between the compartment bottom wall and the compartment top wall.

13. A structure as set forth in claim 12, and in which each common wall of the structure has formed therein an opening communicating with the space between the compartment bottom wall and the compartment top wall.

14. A structure as set forth in claim 12, and in which a shelf tongue extends from each common wall of the structure and supports the compartment bottom wall.

15. A structure as set forth in claim 12, and in which each common wall of the structure has formed therein an opening communicating with the space between the compartment bottom wall and the compartment top wall, and in which a shelf tongue extends from each common wall of the structure and supports the compartment bottom wall.

16. A structure of the type including a plurality of compartments and each compartment having a front end opening in the same plane of the structure and a back wall opposite the front end opening, the structure being formed entirely of sheet metal walls and including spaced opposite side walls and a back wall extending between the rear ends of the side walls, a top wall spanning upper end portions of the side walls and back wall, and a bottom wall spanning lower end portions of the side walls and back wall; and the side walls and back wall of the structure being common to all of the compartments; and a compartment bottom wall spaced from the top wall and bordering the side walls and back wall of the structure, and a compartment top wall adjacent the compartment bottom wall and bordering the side walls and back wall of the structure, and there being a space between the compartment bottom wall and the compartment top wall, each common wall of the structure having formed therein an opening communicating with the space between the compartment bottom wall and the compartment top wall.

17. A structure as set forth in claim 16, and in which a shelf tongue extends from each common wall of the structure and supports the compartment bottom wall.

18. A structure of the type including a plurality of compartments and each compartment having a front end opening in the same plane of the structure and a back wall opposite the front end opening, the structure being formed entirely of sheet metal walls and including a side wall and a back wall extending along the rear end of the side wall, a top wall spanning upper end portions of the side wall and back wall, and a bottom wall spanning lower end portions of the side wall and back wall, and a partition wall located between the top wall and the bottom wall and bordering the side wall and the back wall; and the side wall and the back wall of the structure being common to all of the compartments, the common side wall and the common back wall of the structure constituting a one-piece keel-like formation having a transverse cross section which is an L shape; the top wall and the bottom wall and the partition wall each including a panel portion and border flanges extending from edges of the panel portion in abutment with the common side wall and the common back wall, and connections between the abutting walls and flanges.

19. A structure as set forth in claim 18, and in which the top wall flanges overlap the common side wall and the common back wall.

20. A structure as set forth in claim 19, and in which the bottom wall flanges telescope within the common side wall and the common back wall.

21. A structure as set forth in claim 20, and in which the partition wall flanges abut the inner faces of the common side wall and the common back wall.

22. A structure of the type including a plurality of compartments and each compartment having a front end opening in the same plane of the structure and a back wall opposite the front end opening, the structure being formed entirely of sheet metal walls and including spaced opposite side walls and a back wall extending between the rear ends of the side walls, a top wall spanning upper end portions of the side walls and back wall, and a bottom wall spanning lower end portions of the side walls and back wall, and a partition wall located between the top wall and the bottom wall and bordering the side walls and the back wall; and one of the side walls and the back wall of the structure being common to all of the compartments, the common side wall and the common back wall of the structure constituting a one-piece keel-like formation having a transverse cross section which is an L shape; the top wall and the bottom wall and the partition wall each including a panel portion and border flanges extending from edges of the panel portion in abutment with the common side wall and the common back wall, and connections between the abutting walls and flanges, the back wall having a side flange overlapping a border portion of the other side wall.

23. A structure as set forth in claim 22, and in which the back wall flange and the overlapped side wall border portion are formed with interengaging positioning means.

24. A structure of the type including a plurality of compartments and each compartment having a front end opening in the same plane of the structure and a back wall opposite the front end opening, the structure being formed entirely of sheet metal walls and including spaced opposite side walls and a back wall extending between the rear ends of the side walls, a top wall spanning upper end portions of the side walls and back wall, and a bottom wall spanning lower end portions of the side walls and back wall; and one of the side walls and the back wall of the structure being common to all of the compartments, and the common side wall and the common back wall constituting a one-piece keel-like formation having a transverse cross section which is an L shape; and a compartment bottom wall spaced from the top wall and bordering the side walls and back wall of the structure, and a compartment top wall adjacent the compartment bottom wall and bordering the side walls and back wall of the structure, and there being a space between the compartment bottom wall and the compartment top wall; the top wall and the bottom wall, and the compartment bottom wall and the compartment top wall each including a panel portion and a border flange extending from a side edge of the panel portion in abutment with the common side wall, and connections between the abutting wall and the flanges.

25. A structure of the type including a plurality of compartments and each compartment having a front end opening in the same plane of the structure and a back wall opposite the front end opening, the structure being formed entirely of sheet metal walls and including spaced opposite side walls and a back wall extending between the rear ends of the side walls, a top wall spanning upper end portions of the side walls and back wall, and a bottom wall spanning lower end portions of the side walls and back wall; and one of the side walls and the back wall of the structure being common to all of the compartments, and the common side wall and the common back wall constituting a one-piece keel-like formation having a transverse cross section which is an L shape; and a compartment bottom wall spaced from the top wall and bordering the side walls and back wall of the structure, and a compartment top wall adjacent the compartment bottom wall and bordering the side walls and back wall of the structure, and there being a space between the compartment bottom wall and the compartment top wall; the top wall and the bottom wall and the compartment top wall each including a panel portion and border flanges extending from edges of the panel portion in abutment with the common side wall and the common back wall, and connections between the abutting walls and flanges.

26. A structure as set forth in claim 25, and in which the compartment bottom wall has a flange in abutment with the common side wall and connections between the compartment bottom wall flange and the common side wall.

27. A structure of the type including a plurality of compartments and each compartment having a front end opening in the same plane of the structure and a back wall opposite the front end opening, the structure being formed entirely of sheet metal walls and including spaced opposite side walls and a back wall extending between the rear ends of the side walls, the side walls and the back wall being common to all of the compartments, a top wall spanning upper end portions of the side walls and back wall, and a bottom wall spanning lower end portions of the side walls and back wall, and a partition wall located between the top wall and the bottom wall and bordering the common side walls and the back wall; and flange means on each side wall in positioning abutment with top and bottom portions of the partition wall.

28. A structure of the type including a plurality of compartments and each compartment having a front end opening in the same plane of the structure and a back wall opposite the front end opening, the structure being formed entirely of sheet metal walls and including spaced opposite side walls and a back wall extending between the rear ends of the side walls, a top wall spanning upper end portions of the side walls and back wall, and a bottom wall spanning lower end portions of the side walls and back wall, and a partition wall located between the top wall and the bottom wall and bordering the side walls and the back wall; and flange means on each side wall in positioning abutment with top and bottom portions of the partition wall each flange means on each side wall protruding therefrom towards the other side wall.

29. A structure of the type including a plurality of compartments and each compartment having a front end opening in the same plane of the structure and a back wall opposite the front end opening, the structure being formed entirely of sheet metal walls and including spaced opposite side walls and a back wall extending between the rear ends of the side walls, a top wall spanning upper end portions of the side walls and back wall, and a bottom wall spanning lower end portions of the side walls and back wall, and a partition wall located between the top wall and the bottom wall and bordering the side walls and the back wall; and one of the side walls and the back wall of the structure being common to all of the compartments, the common side wall and the common back wall of the structure constituting a one-piece keel-like formation having a transverse cross section which is an L shape; and flange means on each side wall in positioning abutment with top and bottom portions of the partition wall.

References Cited in the file of this patent

UNITED STATES PATENTS

| | | |
|---|---|---|
| 809,497 | Dick | Jan. 9, 1906 |
| 1,178,612 | Weiss | Apr. 11, 1916 |
| 1,207,066 | Millice | Dec. 5, 1916 |
| 1,723,753 | Vance | Aug. 6, 1929 |
| 1,851,192 | Lange | Mar. 29, 1932 |
| 2,333,511 | Bates et al. | Nov. 2, 1943 |
| 2,412,904 | Money | Dec. 17, 1946 |
| 2,547,463 | Haut | Apr. 3, 1951 |
| 2,613,623 | Behrens | Oct. 14, 1952 |
| 2,658,101 | Coxe | Nov. 3, 1953 |